US011605123B2

(12) United States Patent
Fujikawa et al.

(10) Patent No.: US 11,605,123 B2
(45) Date of Patent: Mar. 14, 2023

(54) INFORMATION TERMINAL, INFORMATION PROCESSING METHOD, INFORMATION PROCESSING PROGRAM, AND INFORMATION PROCESSING SYSTEM

(71) Applicant: FUJIFILM Corporation, Tokyo (JP)

(72) Inventors: Tetsuya Fujikawa, Saitama (JP); Masahiko Sugimoto, Saitama (JP); Takeshi Kamiya, Saitama (JP)

(73) Assignee: FUJTFITM Corporation, Tokyo (JP)

( * ) Notice: Subject to any disclaimer, the term of this patent is extended or adjusted under 35 U.S.C. 154(b) by 499 days.

(21) Appl. No.: 16/784,415

(22) Filed: Feb. 7, 2020

(65) Prior Publication Data

US 2020/0175582 A1    Jun. 4, 2020

Related U.S. Application Data

(63) Continuation of application No. PCT/JP2018/022138, filed on Jun. 11, 2018.

(30) Foreign Application Priority Data

Sep. 1, 2017 (JP) .............................. JP2017-168420

(51) Int. Cl.
*G06Q 30/06* (2012.01)
*G06K 7/10* (2006.01)
(Continued)

(52) U.S. Cl.
CPC ..... *G06Q 30/0645* (2013.01); *G06K 7/10386* (2013.01); *G06K 19/0723* (2013.01); *G06Q 10/02* (2013.01)

(58) Field of Classification Search
None
See application file for complete search history.

(56) References Cited

U.S. PATENT DOCUMENTS

2001/0016824 A1    8/2001  Matsushima
2003/0120509 A1*   6/2003  Bruch ................. G07F 17/0042
                                                            705/5
(Continued)

FOREIGN PATENT DOCUMENTS

EP      1 835 375 A1    9/2007
JP      2001-195446 A   7/2001
(Continued)

OTHER PUBLICATIONS

I. K. Mun, A. B. Kantrowitz, P. W. Carmel, K. P. Mason and D. W. Engels, "Active RFID System Augmented With 2D Barcode for Asset Management in a Hospital Setting," 2007, 2007 IEEE International Conference on RFID, pp. 205-211 (Year: 2007).*

(Continued)

*Primary Examiner* — Sarah M Monfeldt
*Assistant Examiner* — Michael J. Monaghan
(74) *Attorney, Agent, or Firm* — Birch, Stewart, Kolasch & Birch, LLP

(57) ABSTRACT

Provided are an information terminal, an information processing method, a non-transitory computer readable recording medium storing an information processing program, and an information processing system capable of reducing time and effort of a user related to rental of an imaging-equipment. An information terminal includes an acquisition unit that acquires equipment information regarding imaging equipments including specification information for respectively specifying the imaging equipments, a determination unit that determines that the imaging-equipment which is not connected to an imaging device is rentable, and determines that the imaging-equipment which is already connected to an imaging device is not rentable among the imaging equipments indicated by the specification information included in the equipment information acquired by the acquisition unit, (Continued)

and a transmission unit that transmits the specification information, determination result information indicating a determination result performed by the determination unit, and owner information indicating an owner of the imaging-equipment to an external device.

18 Claims, 13 Drawing Sheets

(51) Int. Cl.
*G06K 19/07* (2006.01)
*G06Q 10/02* (2012.01)
*G06Q 30/0645* (2023.01)

(56) References Cited

U.S. PATENT DOCUMENTS

| | | | | |
|---|---|---|---|---|
| 2010/0299172 A1* | 11/2010 | Nottoli | ............... | G06F 3/0483 705/29 |
| 2014/0256261 A1* | 9/2014 | Barrus | ............... | H04B 7/24 455/41.2 |
| 2017/0085390 A1* | 3/2017 | Belveal | ............... | D06F 33/00 |
| 2017/0330274 A1* | 11/2017 | Conant, II | ......... | G06Q 30/0645 |

FOREIGN PATENT DOCUMENTS

| | | |
|---|---|---|
| JP | 2004-171349 A | 6/2004 |
| JP | 2006-178845 A | 7/2006 |
| JP | 2007-124132 A | 5/2007 |
| JP | 2010-134774 A | 6/2010 |
| JP | 2013-242765 A | 12/2013 |
| JP | 2013-250741 A | 12/2013 |

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/022138, dated Mar. 12, 2020.
International Search Report (Form PCT/ISA/210) for International Application No. PCT/JP2018/022138, dated Aug. 14, 2018, with English translation.

* cited by examiner

| OWNER | POSITIONAL INFORMATION | IMAGING EQUIPMENT | RENTABLE /NONRENTABLE | STATE |
|---|---|---|---|---|
| USER A | (x1, y1) | A COMPANY DSC-XXX | NONRENTABLE | - |
| | | A COMPANY LENS-CCC | NONRENTABLE | - |
| | | B COMPANY DSC-YYY | RENTABLE | - |
| | | B COMPANY LENS-AAA | RENTABLE | BEING RENTED |
| | | ... | ... | ... |
| USER B | (x2, y2) | ... | ... | ... |
| ... | ... | ... | ... | ... |

FIG. 11

| | USER NAME XXX | |
|---|---|---|
| IMAGE | MANUFACTURER /MODEL NUMBER | RENTABLE /NONRENTABLE |
| | A COMPANY DSC-XXX | NONRENTABLE |
| | A COMPANY LENS-CCC | NONRENTABLE |
| | B COMPANY DSC-YYY | RENTABLE |
| | B COMPANY LENS-AAA | RENTABLE |
| | B COMPANY LENS-BBB | RENTABLE |
| | C COMPANY STROBE-AAA | RENTABLE |

FIG. 12

| USER | MANUFACTURER /MODEL NUMBER | RENTABLE /NONRENTABLE |
|---|---|---|
| A | A COMPANY LENS-XXX | RENTABLE |
| B | A COMPANY LENS-CCC | RENTABLE |
| C | B COMPANY LENS-AAA | RENTABLE |
| D | B COMPANY LENS-AAA | RENTABLE |
| E | B COMPANY LENS-BBB | RENTABLE |
| F | C COMPANY LENS-SSS | NONRENTABLE |

SEARCH RESULT OF ○○ MOUNT LENS

FIG. 16
RENTAL EQUIPMENT LIST
| IMAGE | MANUFACTURE AND MODEL NUMBER | STATE | USER WHO LEASES EQUIPMENT |
|---|---|---|---|
|  | A COMPANY DSC-XXX | BEING RETURNED | C |
|  | A COMPANY LENS-CCC | BEING RETURNED | C |
|  | B COMPANY DSC-YYY | BEING RENTED | G |
|  | B COMPANY LENS-AAA | BEING RENTED | G |
|  | B COMPANY LENS-BBB | BEING RENTED | G |
|  | C COMPANY STROBE-AAA | BEING RENTED | G |

INFORMATION TERMINAL, INFORMATION PROCESSING METHOD, INFORMATION PROCESSING PROGRAM, AND INFORMATION PROCESSING SYSTEM

CROSS-REFERENCE TO RELATED APPLICATIONS

This application is a Continuation of PCT International Application No. PCT/JP2018/022138 filed on Jun. 11, 2018, which claims priority under 35 U. S. C. § 119(a) to Japanese Patent Application No. 2017-168420 filed on Sep. 1, 2017. Each of the above application(s) is hereby expressly incorporated by reference, in its entirety, into the present application.

BACKGROUND OF THE INVENTION

1. Field of the Invention

The present disclosure relates to an information terminal, an information processing method, a non-transitory computer readable recording medium storing an information processing program, and an information processing system.

2. Description of the Related Art

In the related art, a rental system comprising a terminal device that acquires identification information of an imaging device to and from which an imaging equipment is attachable and detachable from the imaging device and accepts reservation for rental of the imaging equipment is disclosed (see JP2013-250741A). The rental system further comprises a server that acquires the identification information of the imaging device from the terminal device, and manages the reservation for the rental of the imaging equipment based on the acquired identification information.

An article rental information management system that supports rental and lease of articles and comprises a terminal on a user who rents the article, a terminal of a user who leases the article, and a management center is disclosed (see JP2004-171349A). In this management center, contract establishment information is accumulated in a case where rental information which is information related to rental contents of the article and lease information which is information related to leasing contents of the article satisfy a certain condition.

A camera system that comprises a camera main body and peripheral equipments which are attachable and detachable to the camera main body and performs billing management according to a determination result of whether or not rental equipment is attached to the camera system (see JP2007-124132A).

A rental management system comprising a client terminal and a server device that can communicate with a small information device in a wire or wireless manner is disclosed (see JP2001-195446A). In this rental management system, the server device determines whether or not to register reservation for reservation information of the small information device input from the client terminal, and registers the reservation information in a case where it is determined that the reservation registration is possible.

SUMMARY OF THE INVENTION

Incidentally, an imaging device such as a digital camera and a plurality of equipments such as a lens, a filter, and a tripod used together with the imaging device are present as the imaging equipment. Thus, the user of the imaging equipment may not bring all the imaging equipments necessary at an imaging place when the user goes to the imaging place. In some cases, imaging equipments which are not owned by the user are necessary at the imaging place. In these cases, it is desirable that the user can lease a necessary imaging equipment from other users. However, since each user determines whether or not each of the imaging equipments owned by the user is rentable and notifies the other users the imaging equipment determined to be rentable, there is a problem that it takes a lot of time and effort.

The present disclosure has been made in view of the above circumstances, and an object of the present disclosure is to provide an information terminal, an information processing method, a non-transitory computer readable recording medium storing an information processing program, and an information processing system capable of reducing time and effort of a user related to rental of an imaging equipment.

In order to achieve the aforementioned object, an information terminal of the present disclosure comprises an acquisition unit that acquires equipment information regarding imaging equipments including specification information for respectively specifying the imaging equipments, a determination unit that determines that the imaging equipment which is not connected to an imaging device is rentable, and determines that the imaging equipment which is already connected to an imaging device is not rentable, among the imaging equipments indicated by the specification information included in the equipment information acquired by the acquisition unit, and a transmission unit that transmits the specification information, determination result information indicating a determination result performed by the determination unit, and owner information indicating an owner of the imaging equipment to an external device.

In the information terminal of the present disclosure, the equipment information may be information read by a reading device through wireless communication, and the determination unit may further determine whether or not the imaging equipment is rentable depending on a distance between the imaging equipment and the reading device at the time of reading the equipment information.

In the information terminal of the present disclosure, the determination unit may further determine that the imaging equipment is not rentable in a case where the imaging equipment is a recording medium of which at least a part is already used.

In the information terminal of the present disclosure, in a case where information indicating that the imaging equipment is used as a group of a plurality of imaging equipments is included in the equipment information and at least one imaging equipment included in the group of the plurality of imaging equipments is not rentable, the determination unit may determine that the entire group of the plurality of imaging equipments is not rentable.

In the information terminal of the present disclosure, the transmission unit may further transmit positional information of the information terminal.

Meanwhile, in order to achieve the aforementioned object, an information processing method of the present disclosure comprises acquiring equipment information regarding imaging equipments including specification information for respectively specifying the imaging equipments, determining that the imaging equipment which is not connected to an imaging device is rentable, and determining that the imaging equipment which is already connected to an imaging device is not rentable, among the imaging equipments indicated by the specification information included in the acquired equipment information, and transmitting the specification information, determination result information indicating a determination result, and owner information indicating an owner of the imaging equipment to an external device.

In order to achieve the aforementioned object, a non-transitory computer readable recording medium storing an information processing program of the present disclosure causes a computer to execute processes of acquiring equipment information regarding imaging equipments including specification information for respectively specifying the imaging equipments, determining that the imaging equipment which is not connected to an imaging device is rentable, and determining that the imaging equipment which is already connected to an imaging device is not rentable, among the imaging equipments indicated by the specification information included in the acquired equipment information, and transmitting the specification information, determination result information indicating a determination result, and owner information indicating an owner of the imaging equipment to an external device.

In order to achieve the aforementioned object, an information processing system of the present disclosure comprises an information terminal that includes an acquisition unit which acquires equipment information regarding imaging equipments including specification information for respectively specifying the imaging equipments, and a transmission unit which transmits the equipment information acquired by the acquisition unit and owner information indicating an owner of the imaging equipment to an information processing apparatus, and the information processing apparatus that includes a reception unit which receives the equipment information and the owner information transmitted from the transmission unit, and a determination unit which determines that the imaging equipment which is not connected to an imaging device is rentable, and determines that the imaging equipment which is already connected to an imaging device is not rentable among the imaging equipments indicated by the specification information included in the equipment information received by the reception unit.

In the information processing system of the present disclosure, the information processing apparatus may further comprise an acceptance unit that accepts an acquisition command of the specification information, and a search unit that searches for the imaging equipment indicated by the specification information included in the acquisition command accepted by the acceptance unit and the imaging equipment which is compatible with the imaging equipment indicated by the specification information included in the acquisition command from the imaging equipments determined by the determination unit.

An information terminal of the present disclosure includes a processor configured to acquire equipment information regarding imaging equipments including specification information for respectively specifying the imaging equipments, determine that the imaging equipment which is not connected to an imaging device is rentable, and determine that the imaging equipment which is already connected to an imaging device is not rentable, among the imaging equipments indicated by the specification information included in the acquired equipment information, and transmit the specification information, determination result information indicating a determination result, and owner information indicating an owner of the imaging equipment to an external device.

According to the present disclosure, it is possible to reduce time and effort of the user related to the rental and lease of the imaging equipment.

BRIEF DESCRIPTION OF THE DRAWINGS

FIG. 11 is a diagram showing an example of a search result display screen according to the embodiment.

FIG. 12 is a diagram showing an example of the search result display screen according to the embodiment.

FIG. 16 is a diagram showing an example of a rental equipment list display screen according to the embodiment.

FIG. 17 is a diagram showing an example of an equipment return screen according to the embodiment.

DESCRIPTION OF THE PREFERRED EMBODIMENTS

Hereinafter, an embodiment for carrying out a technology of the present disclosure will be described in detail with reference to the drawings.

Figure 1:
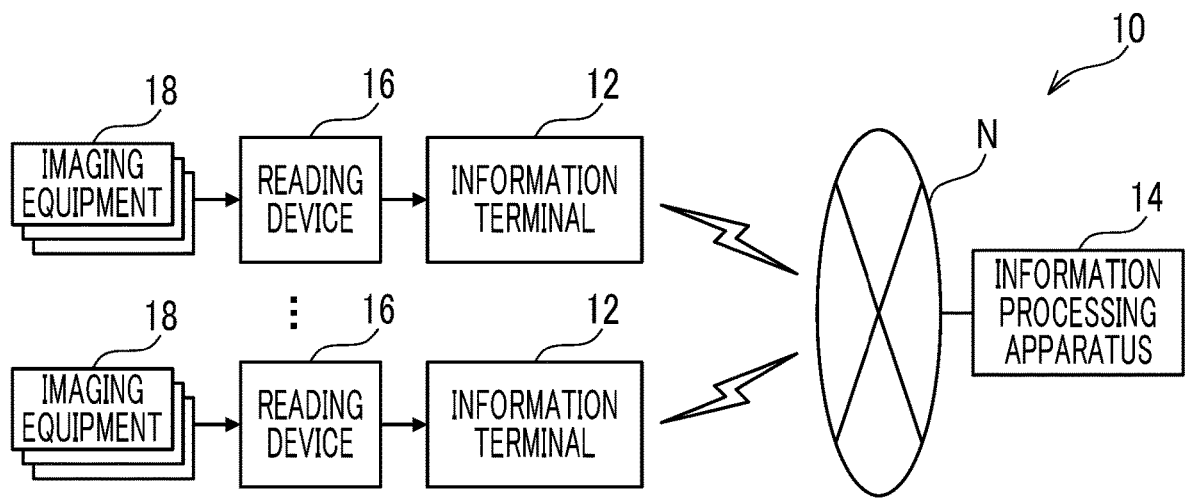
FIG. 1 is a block diagram illustrating an example of a configuration of an information processing system according to an embodiment.

First, a configuration of an information processing system 10 according to the present embodiment will be described with reference to FIG. 1. As illustrated in FIG. 1, the information processing system 10 according to the present embodiment includes a plurality of information terminals 12 and an information processing apparatus 14. The information terminals 12 are connected to the network N and each information terminal 12 and the information processing apparatus 14 are connected to the network so as to communicate with each other. Examples of the information terminal 12 include mobile terminals such as smartphones and tablet computers. Examples of the information processing apparatus 14 include an information processing apparatus such as a server computer.

A reading device 16 is provided so as to correspond to each information terminal 12. The reading device 16 reads equipment information regarding an imaging equipment 18 (hereinafter, simply referred to as "equipment information") through short-range wireless communication, and transmits the read equipment information to the corresponding information terminal 12 through short-range wireless communication. Information indicating a manufacturer name of the imaging equipment 18 and information indicating a model number of the imaging equipment 18 are included in the equipment information according to the present embodiment. The information indicating the manufacturer name and the information indicating the model number of the imaging equipment included in the equipment information are examples of specification information for specifying the imaging equipment 18. Hereinafter, the information indicating the manufacturer name and the information indicating the model number of the imaging equipment included in the equipment information are collectively referred to as the "specification information".

The reading device 16 according to the present embodiment reads the equipment information from the imaging equipment 18 through wireless communication according to a wireless communication function of the imaging equipment 18 for the imaging equipment 18 having the wireless communication function such as an imaging device. The reading device 16 reads equipment information recorded in a recording medium having a wireless communication function such as a radio frequency identifier (RFID) tag provided at the imaging equipment 18 through wireless communication according to the wireless communication function of the recording medium for the imaging equipment 18 having no wireless communication function such as a tripod and a filter.

For the imaging equipment 18 in which a plurality of equipments such as neutral density (ND) filters and soft filters is used as one group, information indicating that the equipment is used as the group is included in the equipment information according to the present embodiment. For the imaging equipment 18 such as a recording medium (for example, a memory card) for recording data, information indicating whether or not at least a part of a data storage region of the recording medium is already used is included in the equipment information according to the present embodiment.

For the imaging equipment 18 for which a user who is an owner of the imaging equipment 18 determines not to be rentable to other users, information indicating that this imaging equipment is not rentable which is set by the user and is included in the equipment information according to the present embodiment.

For the imaging equipment 18 (for example, the imaging device) capable of detecting that another imaging equipment 18 such as a lens is connected, specification information for specifying the other connected imaging equipment 18 is included in the equipment information according to the present embodiment. For the imaging equipment 18 in which an operation log of the imaging device is recorded, the operation log is included in the equipment information according to the present embodiment.

The reading device 16 according to the present embodiment detects a signal level of a radio signal at the time of reading the equipment information from the imaging equipment 18, and also transmits the detected signal level to the information terminal 12. The information terminal 12 receives the signal level transmitted from the reading device 16, and derives a distance between the imaging equipment 18 and the reading device 16 by using the received signal level.

Figure 2:
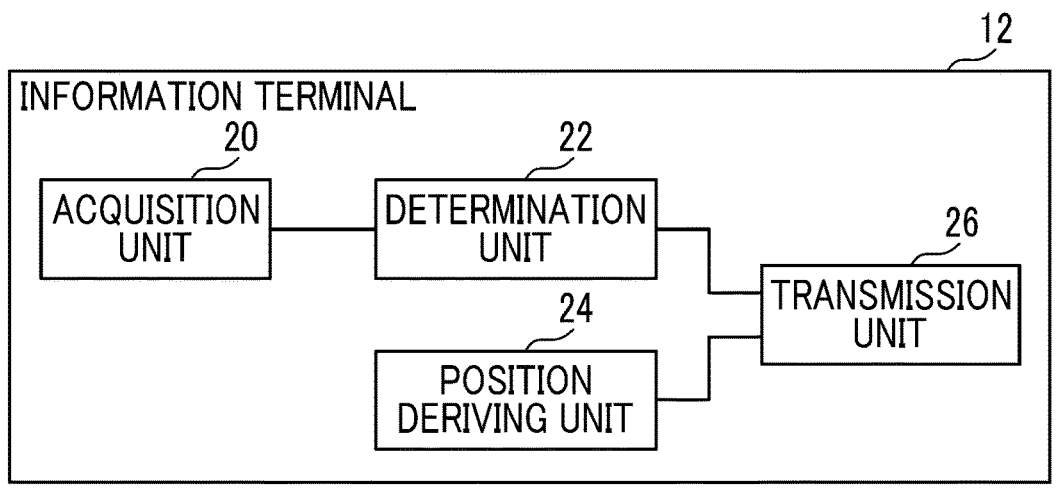
FIG. 2 is a block diagram showing an example of a functional configuration of an information terminal according to the embodiment.

Next, a functional configuration of the information terminal 12 according to the present embodiment will be described with reference to FIG. 2. As illustrated in FIG. 2, the information terminal 12 according to the present embodiment includes an acquisition unit 20, a determination unit 22, a position deriving unit 24, and a transmission unit 26.

The acquisition unit 20 acquires the equipment information transmitted from the reading device 16 and the signal level at the time of reading the equipment information by using the reading device 16 for each imaging equipment 18. For example, the acquisition unit 20 may acquire the equipment information and the signal level according to a command from the user, or may periodically acquire the equipment information and the signal level.

The determination unit 22 determines whether or not the imaging equipment 18 is rentable based on the equipment information and signal level acquired by the acquisition unit 20.

In the present embodiment, the determination unit 22 determines that the imaging equipment 18 which is not connected to the imaging device is rentable based on the equipment information acquired by the acquisition unit 20, and determines that the imaging equipment 18 which is already connected to the imaging device is not rentable.

Figure 3:
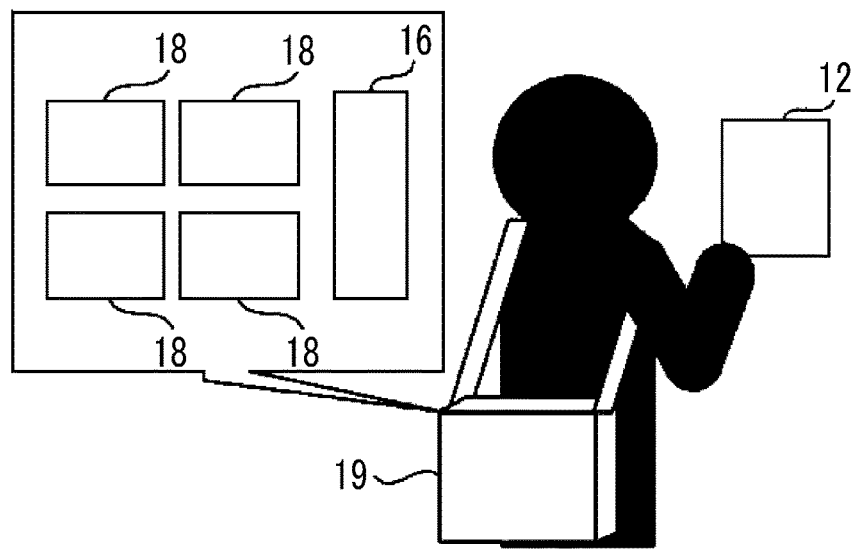
FIG. 3 is a diagram for describing a determination process depending on a distance between a reading device and an imaging equipment according to the embodiment.

The determination unit 22 derives the distance between the imaging equipment 18 and the reading device 16 based on the signal level acquired by the acquisition unit 20. The determination unit 22 determines that the imaging equipment 18 of which the derived distance is equal to or less than a predetermined value is rentable, and determines that the imaging equipment 18 of which the derived distance exceeds the predetermined value is not rentable. The determination based on this distance will be described with reference to FIG. 3. For example, as shown in FIG. 3, the user stores the reading device 16 in a housing 19 that stores the imaging equipment 18 such as a camera bag in many cases. The user places the imaging equipment 18 which is used out of the housing 19, hangs the imaging equipment around their neck, or holds the imaging equipment in their hand in many cases. Meanwhile, the user often stores the imaging equipment 18 which is not used, that is, the imaging equipment 18 which is rentable, in the housing 19. Thus, since the imaging equipment 18 in which the distance between the imaging equipment 18 and the reading device 16 is equal to or less than the predetermined value is stored in the housing 19, the determination unit 22 according to the present embodiment considers that this imaging equipment is not used by the user, and determines that this imaging equipment is rentable.

In a case where the distance between the imaging device and the imaging equipment 18 is equal to or less than a predetermined value as a distance with which the imaging device and the imaging equipment 18 are already connected, the determination unit 22 may determine that the imaging device and the imaging equipment 18 are already connected.

In a case where the imaging equipment 18 is a recording medium in which at least a part of the data storage region is already used, the determination unit 22 determines that this imaging equipment is not rentable based on the equipment information acquired by the acquisition unit 20.

In a case where the information indicating that the imaging equipment is used as a group of the plurality of imaging equipments 18 is included in the equipment information acquired by the acquisition unit 20 and at least one imaging equipment 18 included in the group of the plurality of imaging equipments 18 is not rentable, the determination unit 22 determines that all the imaging equipments 18 included in the group are not rentable.

The determination unit 22 determines that the imaging equipment 18 having the information indicating that the imaging equipment is not rentable which is set by the user is included in the equipment information acquired by the acquisition unit 20 is not rentable. The determination unit 22 determines that the imaging equipment 18 of which an operation confirmation result is abnormal is not rentable.

The determination unit 22 adds, as determination result information indicating the determination result, information indicating that the imaging equipment is rentable or information indicating that the imaging equipment is not rentable to the specification information included in the equipment information for each imaging equipment 18.

The position deriving unit 24 according to the present embodiment receives signals from three or more Global Positioning System (GPS) satellites, and derives a position (latitude and longitude in the present embodiment) of the information terminal 12 by using the received signals.

The transmission unit 26 according to the present embodiment transmits the specification information, the determination result information indicating the determination result performed by the determination unit 22 added to the specification information, and owner information indicating the owner of the imaging equipment 18 to the information processing apparatus 14 as an example of an external device via the network N. The transmission unit 26 according to the present embodiment also transmits positional information indicating the position of the information terminal 12 derived by the position deriving unit 24 to the information processing apparatus 14.

Figure 4:
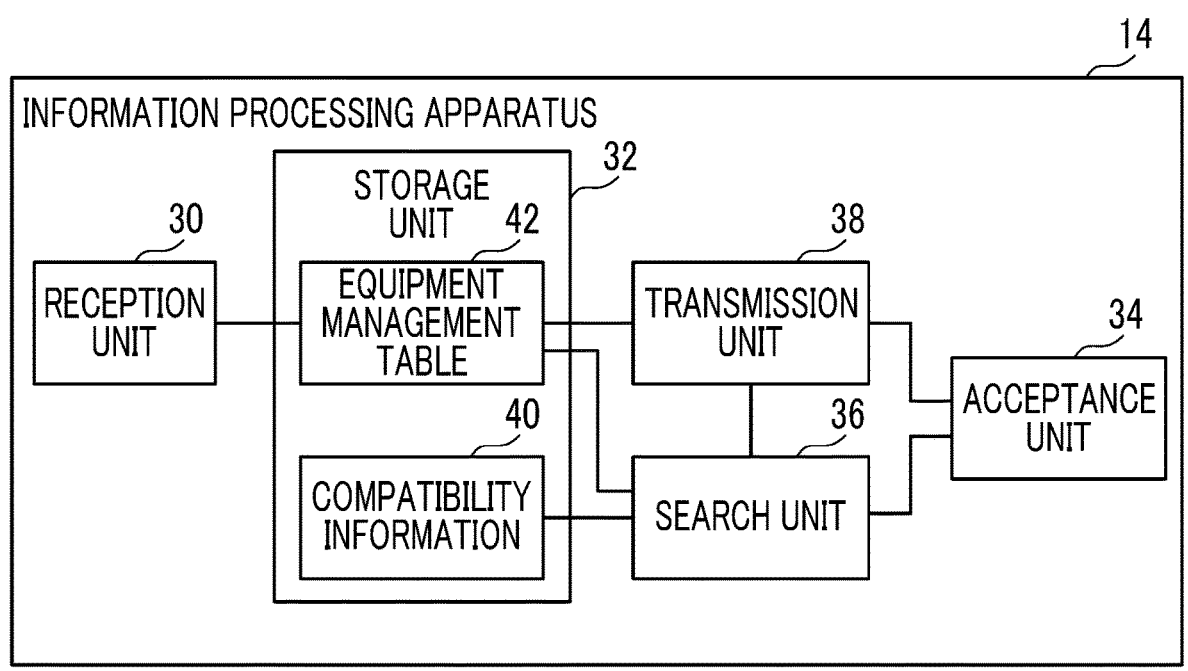
FIG. 4 is a block diagram showing an example of a functional configuration of an information processing apparatus according to the embodiment.

Next, a functional configuration of the information processing apparatus 14 according to the present embodiment will be described with reference to FIG. 4. As illustrated in FIG. 4, the information processing apparatus 14 according to the present embodiment includes a reception unit 30, a storage unit 32, an acceptance unit 34, a search unit 36, and a transmission unit 38. The storage unit 32 stores compatibility information 40 in advance. The compatibility information 40 according to the present embodiment includes specification information for specifying another imaging equipment 18 that is compatible with the imaging equipment 18 for each imaging equipment 18.

The reception unit 30 according to the present embodiment stores the specification information, the determination result information, the positional information, and the owner information transmitted from the information terminal 12 in association with each other in an equipment management table 42. In a case where a record including the same specification information and owner information as the received specification information and owner information is present in the equipment management table 42, the reception unit 30 updates the determination result information and the positional information of the record by using received determination result information and positional information.

Figures 5, 6:
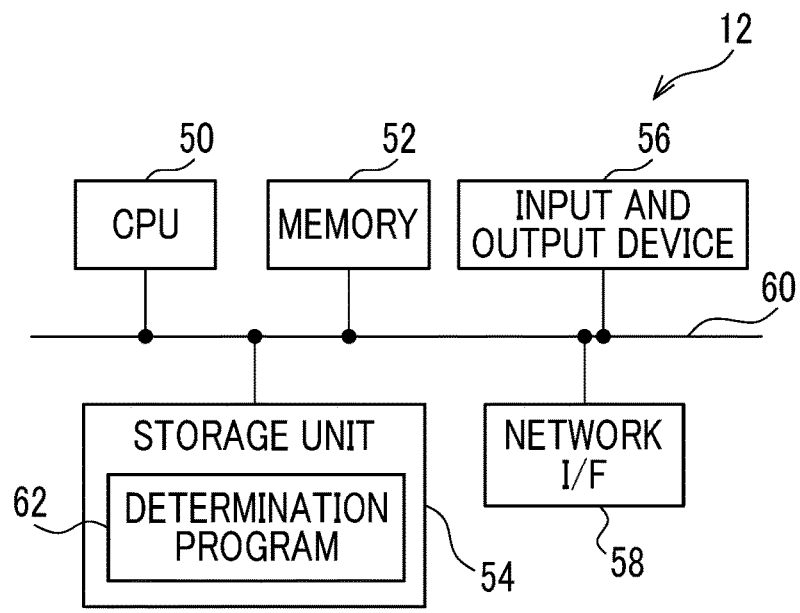
FIG. 5 is a diagram showing an example of an equipment management table according to the embodiment.
FIG. 6 is a block diagram showing an example of a configuration of a main part of an electrical system of the information terminal according to the embodiment.

FIG. 5 shows an example of the equipment management table 42. As shown in FIG. 5, the owner, the positional information, the imaging equipment, rentable/non-rentable, and a status are stored in the equipment management table 42. The owner information received by the reception unit 30 is stored in an owner column of the equipment management table 42, and the positional information received by the reception unit 30 is stored in a positional information column. The specification information received by the reception unit 30 is stored in an imaging equipment column of the equipment management table 42, and the determination result information received by the reception unit 30 is stored in a rentable/nonrentable column. Statuses related to the rental and return of the imaging equipment 18 being rented and returned are stored in a status column of the equipment management table 42. Information is not stored in the status column for the imaging equipment 18 owned by the owner without being rented.

The acceptance unit 34 according to the present embodiment accepts an acquisition command of a list of the imaging equipments 18 transmitted from the information terminal 12. In the present embodiment, a search condition such as the owner information, the positional information, and the specification information are added together with the acquisition command from the information terminal 12 in many cases.

The search unit 36 according to the present embodiment searches the equipment management table 42 for the record satisfying the search condition in a case where the search condition is added to the acquisition command accepted by the acceptance unit 34. For example, in a case where the owner information is included in the search condition, the search unit 36 searches for a record in which the information stored in the owner column of the equipment management table 42 is the same as the owner information included in the search condition.

In a case where the positional information is included in the search condition, the search unit 36 searches for the record of which the position indicated by the positional information in the equipment management table 42 is a position within a predetermined distance range from the position indicated by the positional information included in the search condition.

In a case where the search condition includes specification information, the search unit 36 searches for a record in which the information stored in the imaging equipment column of the equipment management table 42 is the same as the specification information included in the search condition. Further, in this case, the search unit 36 refers to the compatibility information 40 and acquires specification information for specifying the imaging equipment 18 that is compatible with the imaging equipment 18 specified by the specification information included in the search condition. In this case, the search unit 36 also searches for a record in which the information stored in the imaging equipment column of the equipment management table 42 is the same as the acquired specification information.

In a case where the search condition is not added to the acquisition command accepted by the acceptance unit 34, the transmission unit 38 transmits all the records in the equipment management table 42 to the information terminal 12 which is a transmission source of the acquisition command. In a case where the search condition is added to the acquisition command accepted by the acceptance unit 34, the transmission unit 38 transmits the record searched by the search unit 36 to the information terminal 12 which is the transmission source of the acquisition command.

Next, a hardware configuration of the information terminal 12 will be described with reference to FIG. 6. The information terminal 12 is realized by a computer shown in FIG. 6. As shown in FIG. 6, the information terminal 12 includes a central processing unit (CPU) 50, a memory 52 as a temporary storage region, and a nonvolatile storage unit 54. The information terminal 12 includes an input and output device 56 such as a touch panel display and a network interface (I/F) 58 connected to the network N. The CPU 50, the memory 52, the storage unit 54, the input and output device 56, and the network I/F 58 are connected via a bus 60.

The storage unit 54 is realized by a flash memory. A determination program 62 is stored in the storage unit 54 as a storage medium. The CPU 50 reads out the determination program 62 from the storage unit 54, and loads and executes the readout determination program 62 into the memory 52. The CPU 50 functions as the acquisition unit 20, the determination unit 22, the position deriving unit 24, and the transmission unit 26 illustrated in FIG. 2 by executing the determination program 62.

Figure 7:
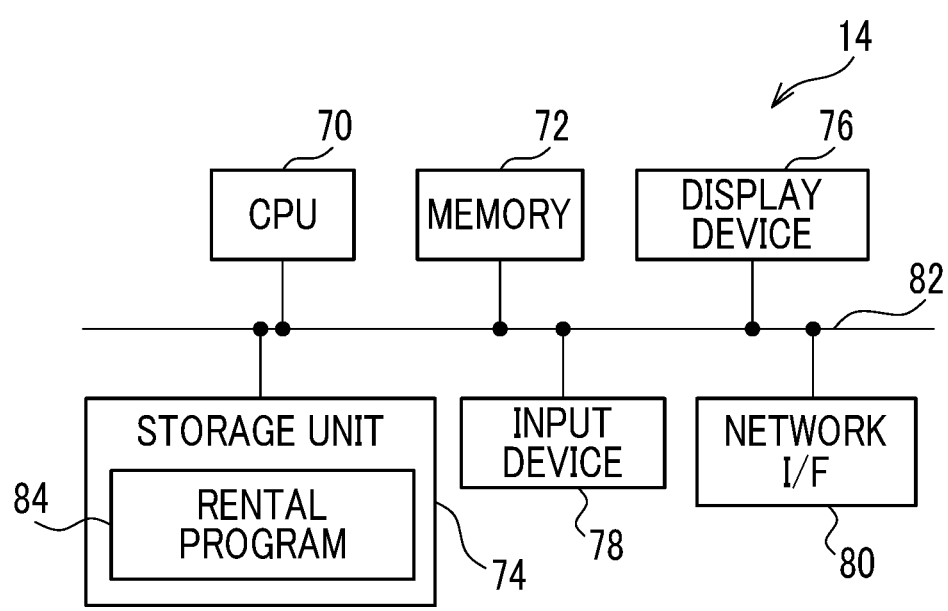
FIG. 7 is a block diagram illustrating an example of a configuration of a main part of an electrical system of the information processing apparatus according to the embodiment.

Next, a hardware configuration of the information processing apparatus 14 will be described with reference to FIG. 7. The information processing apparatus 14 is realized by a computer shown in FIG. 7. As illustrated in FIG. 7, the information processing apparatus 14 includes a CPU 70, a memory 72 as a temporary storage region, and a nonvolatile storage unit 74. The information processing apparatus 14 includes a display device 76 such as a liquid crystal display, an input device 78 such as a keyboard and a mouse, and a network I/F 80 connected to the network N. The CPU 70, the memory 72, the storage unit 74, the display device 76, the input device 78, and the network I/F 80 are connected via a bus 82.

The storage unit 74 is realized by a hard disk drive (HDD), a solid state drive (SSD), a flash memory. A rental program 84 is stored in the storage unit 74 as a storage medium. The CPU 70 reads out the rental program 84 from the storage unit 74, and loads and executes the readout rental program 84 into the memory 72. The CPU 70 functions as the reception unit 30, the acceptance unit 34, the search unit 36, and the transmission unit 38 illustrated in FIG. 4 by executing the rental program 84. The storage unit 32 illustrated in FIG. 4 is realized by the storage unit 74 illustrated in FIG. 7.

Figure 8:
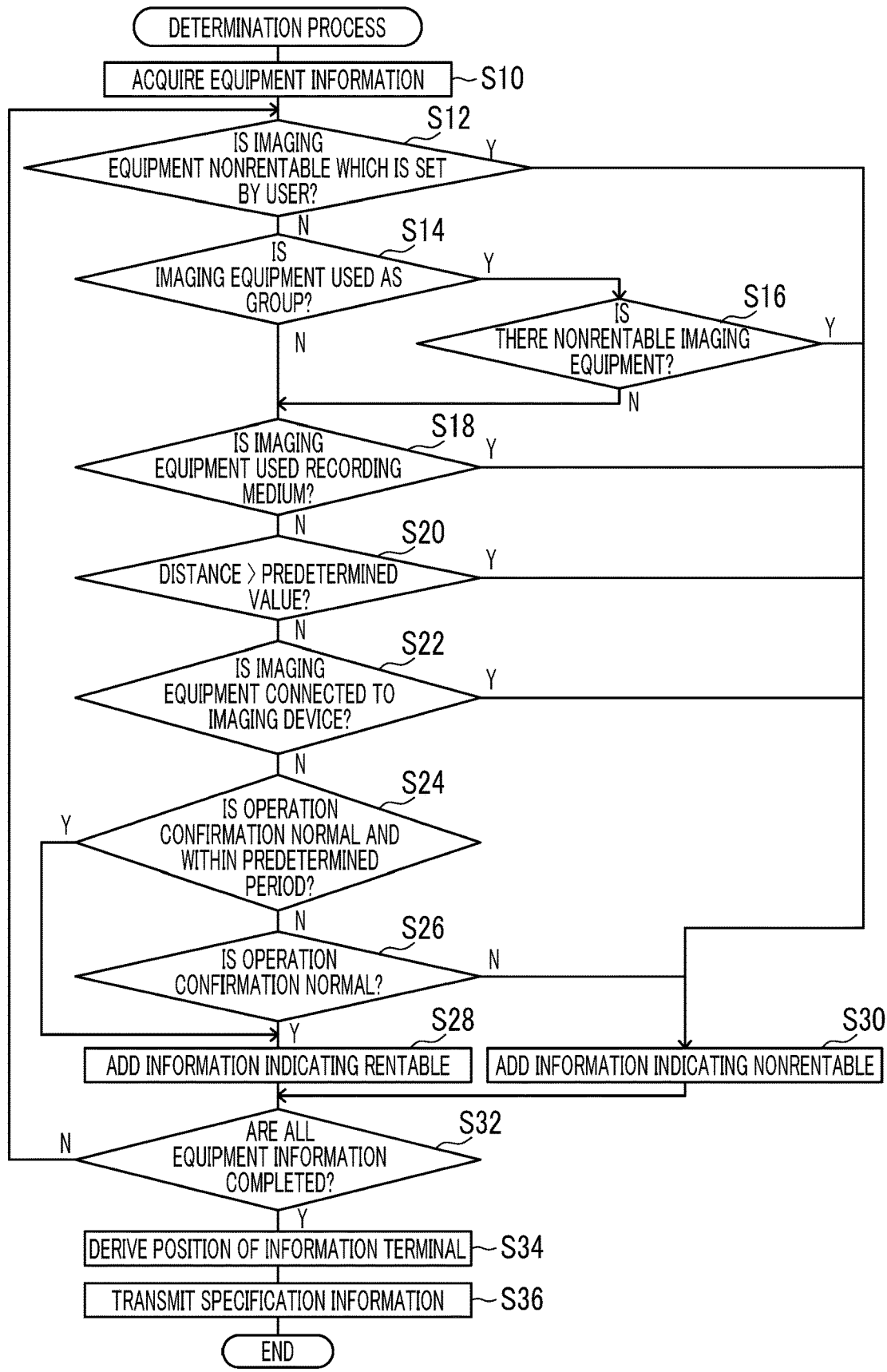
FIG. 8 is a flowchart illustrating an example of the determination process according to the embodiment.

Next, an action of the information terminal 12 according to the present embodiment will be described with reference to FIG. 8. The information terminal 12 executes the determination program 62, and thus, a determination process shown in FIG. 8 is performed. For example, the determination process shown in FIG. 8 is performed in a case where the equipment information is read by the reading device 16 through a manipulation of the user and the information terminal 12 receives the read equipment information.

In step S10 of FIG. 8, the acquisition unit 20 acquires the equipment information transmitted from the reading device 16 and the signal level at the time of reading the equipment information by using the reading device 16 for each imaging equipment 18. The processes of the following steps S12 to S30 are performed by using, as processing targets, the signal level and the equipment information corresponding to each imaging equipment 18 acquired in step S10. At the time of repeatedly performing the processes of steps S12 to S30, the equipment information and the signal level which are not regarded as the processing targets so far are the processing targets.

In step S12, the determination unit 22 determines whether or not the information indicating that the imaging equipment is not rentable which is set by the user is included in the equipment information of the processing target. In a case where this determination is a positive determination, the process proceeds to step S30, and in a case where the determination is a negative determination, the process proceeds to step S14. In step S14, the determination unit 22 determines whether or not the information indicating that the imaging equipment is used as one group of the plurality of imaging equipments 18 is included in the equipment information of the processing target. In a case where this determination is a positive determination, the process proceeds to step S16, and in a case where the determination is a negative determination, the process proceeds to step S18.

In step S16, the determination unit 22 determines whether or not the imaging equipment 18 determined not to be rentable in the repeated processes of steps S12 to S30 is included in the imaging equipments 18 belonging to the same group as the imaging equipment 18 indicated by the specification information included in the equipment information of the processing target. In a case where this determination is a positive determination, the process proceeds to step S30, and in a case where the determination is a negative determination, the process proceeds to step S18.

In step S18, the determination unit 22 determines whether or not the imaging equipment 18 is the recording medium in which at least a part of the data storage region is already used based on the equipment information of the processing target. In a case where this determination is a positive determination, the process proceeds to step S30, and in a case where the determination is a negative determination, the process proceeds to step S20.

In step S20, the determination unit 22 derives the distance between the imaging equipment 18 and the reading device 16 based on the signal level of the processing target. The determination unit 22 determines whether or not the derived distance exceeds the predetermined value. In a case where this determination is a positive determination, the process proceeds to step S30, and in a case where the determination is a negative determination, the process proceeds to step S22. In step S22, the determination unit 22 determines whether or not the imaging equipment 18 indicated by the equipment information of the processing target is already connected to the imaging device. In a case where this determination is a positive determination, the process proceeds to step S30, and in a case where the determination is a negative determination, the process proceeds to step S24.

In step S24, the determination unit 22 determines whether or not the operation confirmation result of the imaging equipment 18 indicated by the equipment information of the processing target is normal and a date on which the operation confirmation result is confirmed to be normal is within a predetermined period retroactive from the current time. In a case where this determination is a negative determination, the process proceeds to step S26, and in a case where the determination is a positive determination, the process proceeds to step S28. The determination of step S24 is performed by using, for example, the operation log included in the equipment information of the processing target.

In step S26, the determination unit 22 determines whether or not the operation confirmation result of the imaging equipment 18 indicated by the equipment information of the processing target is normal. In a case where this determination is a negative determination, the process proceeds to step S30, and in a case where the determination is a positive determination, the process proceeds to step S28. The determination of step S26 is performed by the following processes, for example. That is, the information terminal 12 displays a message for prompting the operation confirmation and a button for designating the operation confirmation result on the input and output device 56, and the user confirms the operation of the imaging equipment 18. The user designates a "normal" button or an "abnormal" button according to the operation confirmation result. The determination unit 22 performs the determination according to the designated button.

In step S28, the determination unit 22 adds, as the determination result information, the information indicating that the imaging equipment is rentable to the specification information included in the equipment information of the processing target. Meanwhile, in step S30, the determination unit 22 adds, as the determination result information, the information indicating that the imaging equipment is not rentable to the specification information included in the equipment information of the processing target. In step S32, the determination unit 22 determines whether or not the processes of steps S12 to S30 are completed for all the equipment information acquired in step S10. In a case where this determination is a negative determination, the process returns to step S12, and in a case where the determination is a positive determination, the process proceeds to step S34.

In step S34, the position deriving unit 24 receives the signals from three or more GPS satellites, and derives the position of the information terminal by using the received signals. In step S36, the transmission unit 26 transmits the specification information included in each equipment information acquired in step S10, the determination result information added to the specification information, the owner information, and the positional information indicating the position derived in step S34 to the information processing apparatus 14 via the network N. In a case where the process of step S36 is ended, the present determination process is ended.

Figure 9:
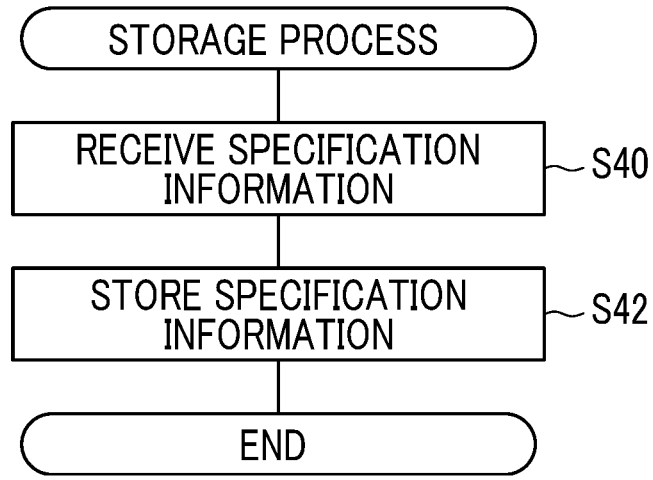
FIG. 9 is a flowchart illustrating an example of a storage process according to the embodiment.
Figure 10:
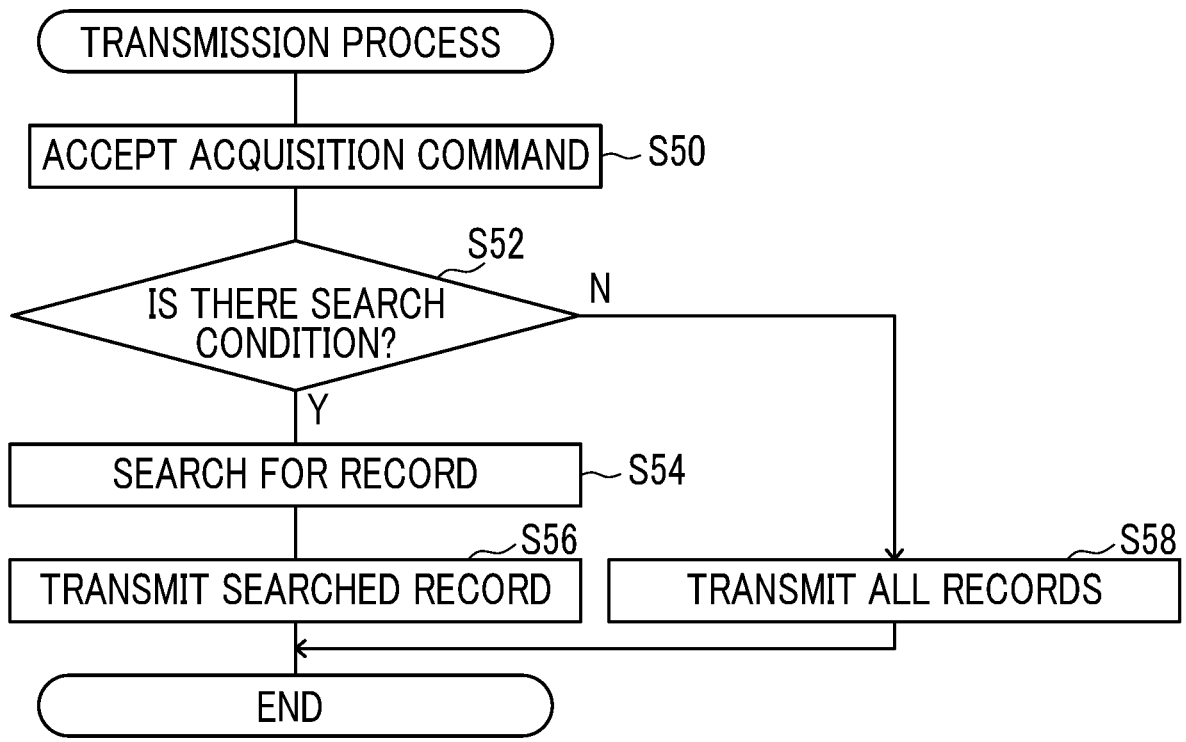
FIG. 10 is a flowchart illustrating an example of a transmission process according to the embodiment.

Next, an operation of the information processing apparatus 14 according to the present embodiment will be described with reference to FIGS. 9 and 10. The information processing apparatus 14 executes the rental program 84, and thus, a storage process shown in FIG. 9 and a transmission process shown in FIG. 10 are performed. For example, the storage process illustrated in FIG. 9 is performed in a case where the information processing apparatus 14 receives the specification information, the determination result information, the owner information, and the positional information transmitted by the process of step S36 of the determination process. The transmission process shown in FIG. 10 is performed in a case where the information processing apparatus 14 receives the acquisition command of the list of the imaging equipments 18 transmitted from the information terminal 12.

In step S40 of FIG. 9, the reception unit 30 receives the specification information, the determination result information, the owner information, and the positional information transmitted by the process of step S36 of the determination process. In the next step S42, the reception unit 30 stores the specification information, the determination result information, the owner information, and the positional information received in step S40 in the equipment management table 42. In a case where the process of step S42 is ended, the present storage process is ended.

In step S50 of FIG. 10, the acceptance unit 34 accepts the acquisition command of the list of the imaging equipments 18 transmitted from the information terminal 12. In the next step S52, the search unit 36 determines whether or not the search condition is added to the acquisition command accepted in step S50. In a case where this determination is a positive determination, the process proceeds to step S54.

In step S54, the search unit 36 searches for the record satisfying the search condition from the equipment management table 42, as described above. In the next step S56, the transmission unit 38 transmits the record searched in step S54 to the information terminal 12 which is the transmission source of the acquisition command accepted in step S50. In a case where the process of step S56 is ended, the present transmission process is ended.

Meanwhile, in a case where the determination in step S52 is a negative determination, the process proceeds to step S58. In step S58, the transmission unit 38 transmits all the records in the equipment management table 42 to the information terminal 12 which is the transmission source of the acquisition command accepted in step S50. In a case where the process of step S58 is ended, the present transmission process is ended.

Figure 13:
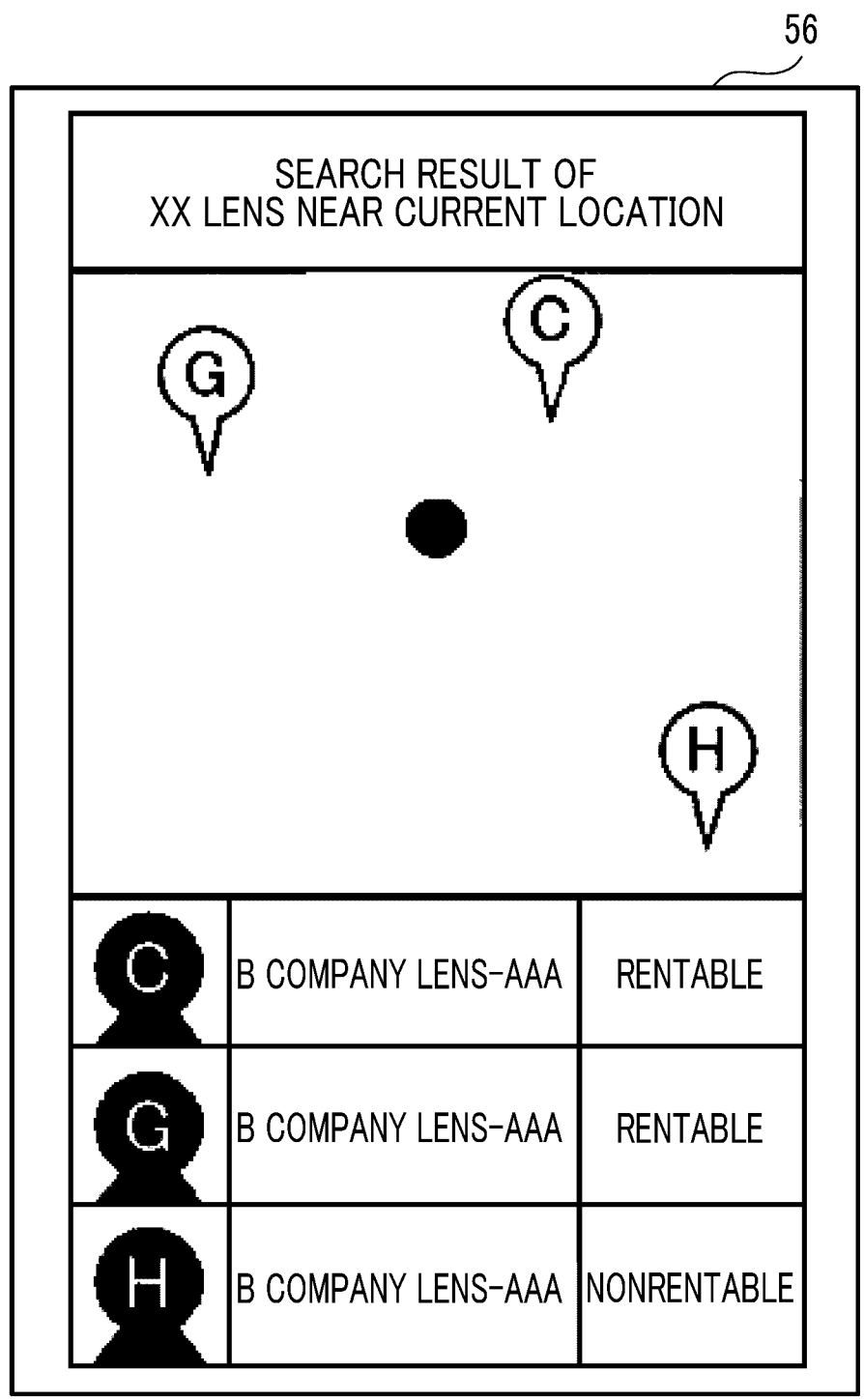
FIG. 13 is a diagram showing an example of the search result display screen according to the embodiment.

The information transmitted from the information processing apparatus 14 through the transmission process is received by the information terminal 12, and the information terminal 12 displays a search result display screen on the input and output device 56 by using the received information. FIGS. 11 to 13 show examples of the search result display screen. FIG. 11 shows an example of the search result display screen for displaying the list of the imaging equipments 18 obtained by searching for the imaging equipment 18 owned by a certain user.

FIG. 12 shows the search result display screen for displaying the list of the imaging equipments 18 obtained by searching for a certain lens. FIG. 13 shows an example of the search result display screen for further displaying a position of the user who owns the imaging equipment 18 by using the positional information. After viewing the search result display screen, the user performs a manipulation for the information terminal 12 so as to transmit a rental request of the imaging equipment 18 for which "rentable/un-rentable" is "rentable" to the information processing apparatus 14. On the search result display screen according to the present embodiment, the imaging equipment 18 in which the determination result column of the equipment management table 42 is "rentable" and the information is not stored in the state column is displayed as the rentable equipment. Only the imaging equipment 18 which is rentable may be displayed on the search result display screen.

The information processing apparatus 14 notifies the information terminal 12 of the user who owns the imaging equipment 18 which is requested to be rent that the rental request is received. The user who rents the imaging equipment 18 and a user who leases the imaging equipment 18 contact each other, and the imaging equipment is rented. In a case where the rental of the imaging equipment 18 is completed, at least one of the user who rents the imaging equipment or the user who leases the imaging equipment performs a manipulation for the information terminal 12 so as to transmit information indicating that the rental is completed to the information processing apparatus 14. In a case where the information indicating that the rental is completed is received, the information processing apparatus 14 updates the status column of the record in the equipment management table 42 corresponding to the imaging equipment 18 for which the rental is completed with "being rent".

Figure 14:
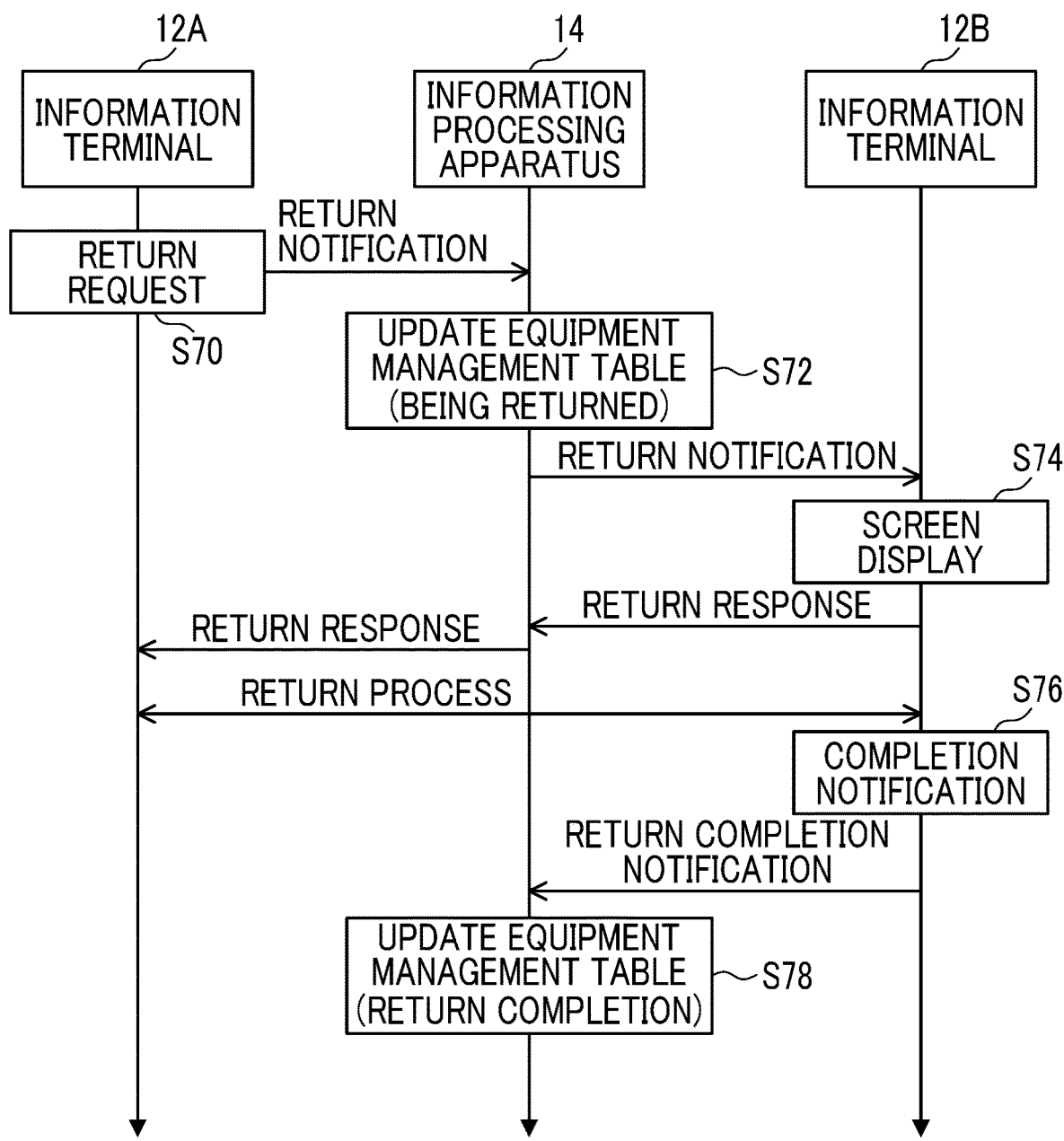
FIG. 14 is a sequence diagram illustrating an example of a processing sequence of a return process according to the embodiment.

Next, a processing sequence of a return process of the imaging equipment 18 according to the present embodiment will be described with reference to FIG. 14. Here, in order to avoid complications, the information terminal 12 owned by the user who leases the imaging equipment 18 is represented as an information terminal 12A, and the information terminal 12 owned by the user who rents the imaging equipment is represented as an information terminal 12B.

In a case where the use of the rented imaging equipment 18 is finished, the user who leases the imaging equipment performs a manipulation for the information terminal 12A so as to transmit a return notification for notifying that the imaging equipment 18 is in a returnable state. Through this manipulation, in step S70 of FIG. 14, the information terminal 12A transmits the specification information indicating the imaging equipment 18 to be returned and the return notification to the information processing apparatus 14.

In a case where the specification information and the return notification transmitted from the information terminal 12A are received, the information processing apparatus 14 updates the status column of the record in the equipment management table 42 corresponding to the received specification information with "being returned" in step S72. The information processing apparatus 14 transmits the specification information and the return notification to the information terminal 12B.

Figure 15:
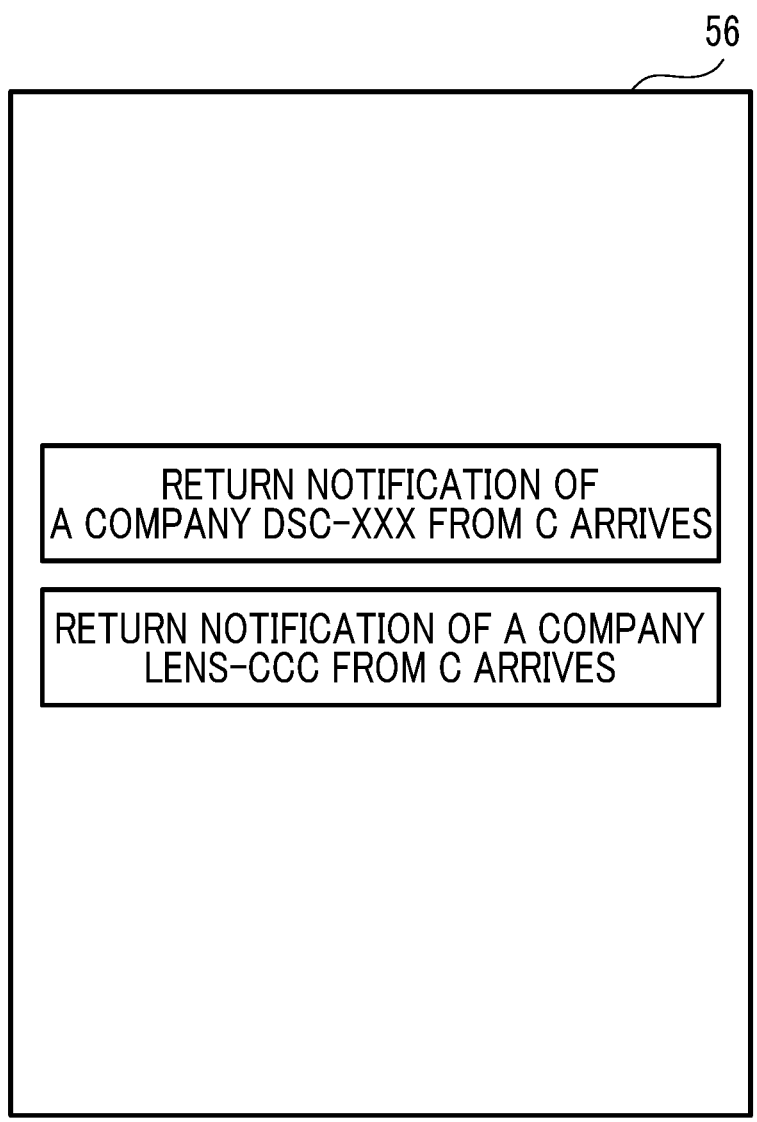
FIG. 15 is a diagram showing an example of a return notification screen according to the embodiment.

In a case where the specification information and the return notification transmitted from the information processing apparatus 14 are received, the information terminal 12B displays, for example, a return notification screen illustrated in FIG. 15 on the input and output device 56 in step S74. As shown in FIG. 15, a message indicating that a notification for returning a certain imaging equipment 18 arrives from a certain user is displayed on the return notification screen according to the present embodiment. In a case where the user who rents the imaging equipment designates the message displayed on the return notification screen, the information terminal 12B displays, for example, a rental equipment list display screen shown in FIG. 16 on the input and output device 56. As shown in FIG. 16, a list of the imaging equipments 18 which are owned by the user who rents the imaging equipment and are being rent to other users is displayed on the rental equipment list display screen according to the present embodiment. A state indicating whether each imaging equipment 18 being rent is being rent or is being returned and the user who leases the imaging equipment are displayed on the rental equipment list display screen according to the present embodiment.

Figure 17:
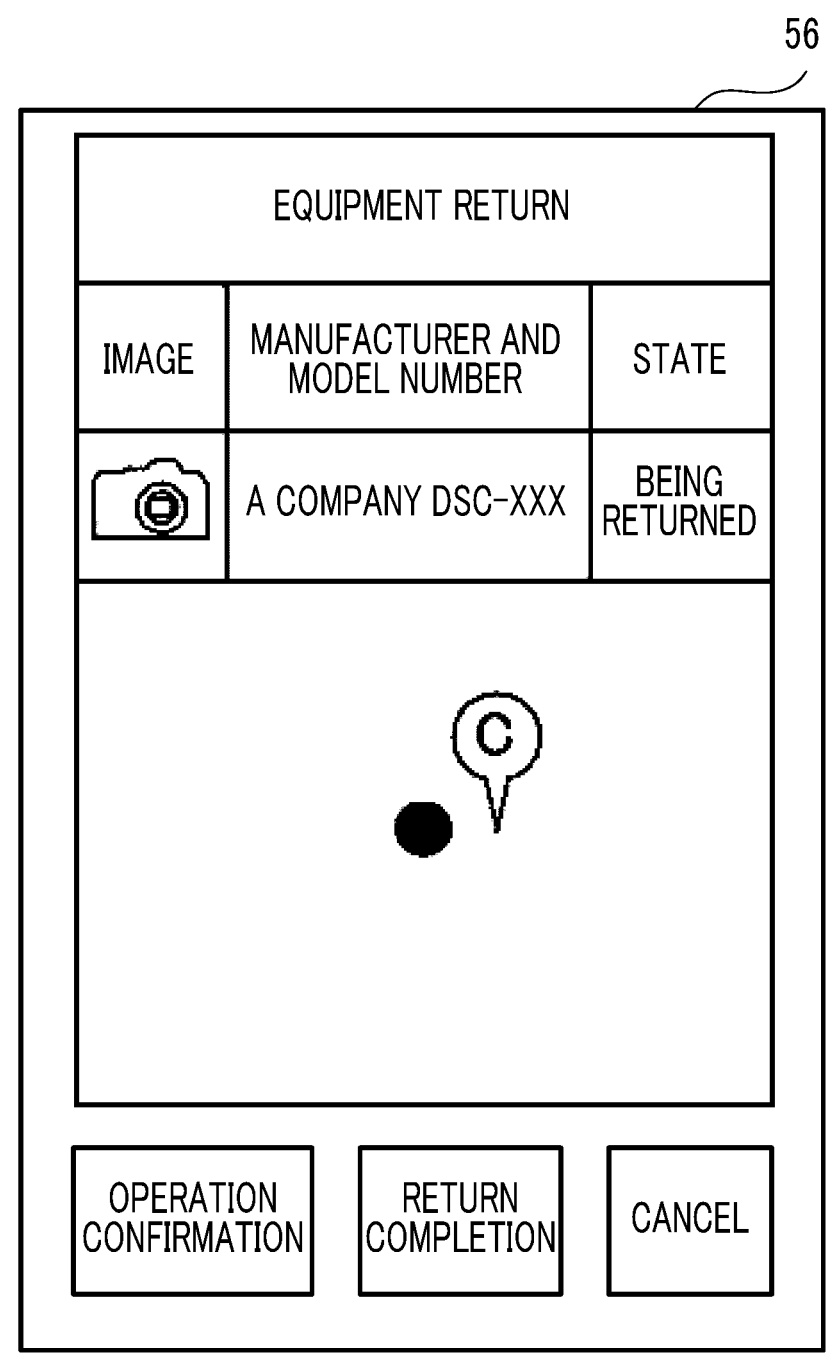

In a case where the user who rents the imaging equipment is ready to receive the imaging equipment 18, the user manipulates the information terminal 12B and designates the imaging equipment 18 to be received. Through this designation, the information terminal 12B displays, for example, an equipment return screen shown in FIG. 17 on the input and output device 56. As shown in FIG. 17, the imaging equipment 18 to be returned, a position of the information terminal 12B, and a position of the user who leases the imaging equipment (that is, the position of the information terminal 12A) are displayed on the equipment return screen according to the present embodiment. An operation confirmation button, a return completion button, and a cancel button are also displayed on the equipment return screen according to the present embodiment.

In a case where the imaging equipment 18 to be received is designated by the user who rents the imaging equipment, the information terminal 12B transmits a return response for receiving the imaging equipment 18 to be returned to the information processing apparatus 14. In a case where the return response transmitted from the information terminal 12B is received, the information processing apparatus 14 transmits the return response to the information terminal 12A. In a case where the return response is received, the information terminal 12A displays a message notifying that the return response is received on the input and output device 56. In a case where the user who leases the imaging equipment views the notification of the return response displayed on the information terminal 12A, the user who leases the imaging equipment contacts the user who rents the imaging equipment, and returns the imaging equipment 18 to be returned to the user who rents the imaging equipment.

The user who rents the imaging equipment performs the operation confirmation of the imaging equipment 18 to be returned, and designates the return completion button of the equipment return screen in a case where the operation confirmation result is normal. In a case where the imaging equipment 18 is an equipment having an operation confirmation mode such as the imaging device, the user who rents the imaging equipment may perform the operation confirmation of the imaging equipment 18 by designating the operation confirmation button on the equipment return screen.

In a case where the user who rents the imaging equipment designates the return completion button, the information terminal 12B transmits the return completion notification to the information processing apparatus 14 in step S76. In a case where the return completion notification transmitted from the information terminal 12B is received, the information processing apparatus 14 deletes the information stored in the status column of the record of the equipment management table 42 corresponding to the imaging equipment 18 for which the return is already completed in step S78. Accordingly, the information is not stored in the status column of this record.

Meanwhile, in a case where the return of the imaging equipment 18 is stopped for some reason such as a case where the operation confirmation result of the imaging equipment 18 to be returned is abnormal, the user who rents the imaging equipment designates the cancel button on the rental equipment list display screen. Through the aforementioned processes, the return process of the imaging equipment 18 is ended.

As described above, according to the present embodiment, it is determined that the imaging equipment 18 which is not connected to the imaging device is rentable, and it is determined that the imaging equipment 18 which is already connected to the imaging device is not rentable. Accordingly, it is possible to reduce the time and effort of the user related to the rental and lease of the imaging equipment.

Although it has been described in the aforementioned embodiment that the information terminals 12 communicate with each other via the information processing apparatus 14, the present invention is not limited thereto. The information terminals 12 may directly communicate with each other. In this case, a mode in which the information terminal 12 transmits the specification information, the determination result information, the owner information, and the positional information to the other information terminals 12 through the process of step S36 of the determination process is illustrated.

In the aforementioned embodiment, the information processing apparatus 14 may have the function of the determination unit 22 included in the information terminal 12. In this case, the information terminal 12 transmits the equipment information and the signal level acquired by the acquisition unit 20 to the information processing apparatus 14. A mode in which the information processing apparatus 14 performs the same determination as that of the determination unit 22 based on the equipment information and the signal level transmitted from the information terminal 12 is illustrated.

In the aforementioned embodiment, various types of processors other than the CPU may execute the determination process, the storage process, and the transmission process executed by the CPU that executes software (program). A dedicated electric circuit which is a processor having a circuit configuration designed as a dedicated processor in order to execute a specific process, such as application specific integrated circuit (ASIC) or programmable logic device (PLD) of which a circuit configuration can be changed after field-programmable gate array (FPGA) is manufactured is used as the processor in this case. The determination process, the storage process, and the transmission process may be executed by one of these various processors, or may be executed by a combination of two or more processors of the same type or different types (for example, a plurality of FPGAs, and a combination of the CPU and the FPGA). Hardware structures of these various processors are more specifically electric circuits in which circuit elements such as semiconductor elements are combined.

Although it has been described in the aforementioned embodiment that the determination program 62 is stored (installed) in the storage unit 54 in advance, the present invention is not limited thereto. The determination program 62 may be provided in a form recorded on a recording medium such as a compact disk read only memory (CD-ROM), a digital versatile disk read only memory (DVD-ROM), and a universal serial bus (USB) memory. The determination program 62 may be downloaded from an external device via a network.

Although it has been described in the aforementioned embodiment that the rental program 84 is stored (installed) in the storage unit 74 in advance, the present invention is not limited thereto. The rental program 84 may be provided in a form recorded on a recording medium such as a CD-ROM, a DVD-ROM, and a USB memory. The rental program 84 may be downloaded from an external device via a network.

EXPLANATION OF REFERENCES

10: information processing system
12, 12A, 12B: information terminal
14: information processing apparatus
16: reading device
20: acquisition unit
22: determination unit
24: position deriving unit
26, 38: transmission unit
30: reception unit
32, 54, 74: storage unit
34: acceptance unit
36: search unit
40: compatibility information
42: equipment management table
50, 70: CPU
52, 72: memory
56: input and output device
58, 80: Network I/F
60, 82: bus
62: determination program
76: display device
78: input device
84: rental program
N: network

What is claimed is:

1. An information terminal for determining whether or not each of one or more imaging equipment is rentable, the information terminal comprising:
a processor configured to:
acquire equipment information, which is read by an associated reading device, from each of the one or more imaging equipment including respectively specification information for specifying each of the one or more imaging equipment, the specification information including information specifying a manufacturer name and model number of the respective imaging equipment, wherein at the time of reading further detect, by the associated reading device, a signal level of a radio signal and transmit the detected signal level to the information terminal;
derive a distance between the respective imaging equipment and the associated reading device based on the received detected signal level;
determine whether a first or second imaging equipment is rentable, based on the derived distance between the first or second imaging equipment and the reading device;
determine that the first imaging equipment is rentable, based on the derived distance being equal to or less than a predetermined value, and determine that the second imaging equipment is not rentable, based on the derived distance being greater than the predetermined value;
and
transmit the specification information, determination result information indicating a determination result, and owner information indicating an owner of the first or second imaging equipment to an external device.

2. The information terminal according to claim 1, wherein the processor further determines that the first or second imaging equipment is not rentable in a case where the first or second imaging equipment is a recording medium of which at least a part is already used.

3. The information terminal according to claim 1, wherein, in a case where information indicating that the first or second imaging equipment is used as a group of a plurality of imaging equipment is included in the equipment information and at least one imaging equipment included in the group of the plurality of imaging equipment is not rentable, the processor determines that the entire group of the plurality of imaging equipment is not rentable.

4. The information terminal according to claim 2, wherein, in a case where information indicating that the first or second imaging equipment is used as a group of a plurality of imaging equipment is included in the equipment information and at least one imaging equipment included in the group of the plurality of imaging equipment is not rentable, the processor determines that the entire group of the plurality of imaging equipment is not rentable.

5. The information terminal according to claim 1, wherein the processor further transmits positional information of the information terminal.

6. The information terminal according to claim 2, wherein the processor further transmits positional information of the information terminal.

7. The information terminal according to claim 3, wherein the processor further transmits positional information of the information terminal.

8. The information terminal according to claim 4, wherein the processor further transmits positional information of the information terminal.

9. An information processing method using the information terminal according to claim 1 comprising:
acquiring the equipment information, which is read by the associated reading device, from each of the one or more imaging equipment including respectively specification information for specifying each of the one or more imaging equipment, the specification information including information specifying the manufacturer name and model number of the respective imaging equipment;

receiving, from the associated reading device, the signal level of a radio signal detected at the time of reading;

deriving the distance between the respective imaging equipment and the reading device based on the received signal level;

determining whether the first or second imaging equipment is rentable, based on the derived distance between the first or second imaging equipment and the associated reading device;

determining that the first imaging equipment is rentable, based on the derived distance being equal to or less than a predetermined value, and determining that the second imaging equipment is not rentable, based on the derived distance being greater than the predetermined value;

and transmitting the specification information, determination result information indicating the determination result, and owner information indicating the owner of the first or second imaging equipment to the external device.

10. A non-transitory computer readable recording medium storing an information processing program causing an information terminal for determining whether or not each of one or more imaging equipment is rentable, the information terminal to execute processes of:

acquiring the equipment information, which is read by an associated reading device, from each of the one or more imaging equipment including respectively specification information for specifying each of the one or more imaging equipment, the specification information including another imaging equipment which is connected to the plurality of imaging equipment or information specifying a manufacturer name and model number of the respective imaging equipment;

receiving a signal level detected at the time of reading transmitted from the associated reading device;

deriving a distance between the respective imaging equipment and the reading device based on the acquired signal level;

determining whether a first or second imaging equipment is rentable, based on the derived distance between the first or second imaging equipment and the associated reading device;

determining that the first imaging equipment is rentable, based on the derived distance being equal to or less than a predetermined value, and determining that the second imaging equipment is not rentable, based on the derived distance being greater than the predetermined value;

and transmitting the specification information, determination result information indicating a determination result, and owner information indicating an owner of the first or second imaging equipment to an external device.

11. An information processing system for determining whether or not each of one or more imaging equipment is rentable, the information processing system comprising:

an information terminal that includes a first processor; and an information processing apparatus that includes a second processor, wherein the first processor is configured to:

acquire equipment information, which is read by an associated reading device, from each of the one or more imaging equipment including respectively specification information for specifying each of the one or more imaging equipment, the specification information including information specifying a manufacturer name and model number of the plurality of imaging equipment, wherein at the time of reading further detect, by the associated reading device, a signal level of a radio signal and transmit the detected signal level to the information terminal;

transmit the equipment information acquired, the detected signal level and owner information indicating an owner of each of the one or more imaging equipment to the information processing apparatus; and the second processor is configured to:

receive the equipment information, the detected signal level and the owner information transmitted;

derive a distance between the respective imaging equipment and the associated reading device based on the received detected signal level;

determine whether a first or second imaging equipment is rentable, based on the derived distance between the first or second imaging equipment and the reading device;

determine that the first imaging equipment is rentable, based on the derived distance being equal to or less than a predetermined value, and determine that the second imaging equipment is not rentable, based on the derived distance being greater than the predetermined value; and store the specification information, determination result information indicating a determination result, and owner information indicating an owner of the first or second imaging equipment in a storage unit of the information processing apparatus.

12. The information processing system according to claim 11, wherein the second processor is further configured to accept an acquisition command of the specification information, and search for the first or second imaging equipment indicated by the specification information included in the acquisition command and an imaging equipment which is compatible with the first or second imaging equipment indicated by the specification information included in the acquisition command.

13. The information processing system according to claim 11, wherein the second processor is further configured to determine that the first or second imaging equipment is not rentable in a case where the first or second imaging equipment is a recording medium of which at least a part is already used.

14. The information processing system according to claim 11, wherein, in a case where information indicating that the first or second imaging equipment is used as a group of a plurality of imaging equipment is included in the equipment information and at least one imaging equipment included in the group of the plurality of imaging equipment is not rentable, the second processor is further configured to determine that the entire group of the plurality of imaging equipment is not rentable.

15. The information processing system according to claim 13, wherein, in a case where information indicating that the first or second imaging equipment is used as a group of a plurality of imaging equipment is included in the equipment information and at least one imaging equipment included in the group of the plurality of imaging equipment is not rentable, the second processor is further configured to determine that the entire group of the plurality of imaging equipment is not rentable.

16. The information processing system according to claim 11,
wherein the first processor is further configured to transmit positional information of the information terminal.

17. The information processing system according to claim 13,
wherein the first processor is further configured to transmit positional information of the information terminal.

18. The information processing system according to claim 14,
wherein the first processor is further configured to transmit positional information of the information terminal.

* * * * *